(12) United States Patent
Lebowsky

(10) Patent No.: US 6,529,459 B1
(45) Date of Patent: Mar. 4, 2003

(54) PROCESS AND DEVICE FOR EXTRACTING BINARY DATA CONVEYED BY AN INCIDENT SIGNAL, IN PARTICULAR A SIGNAL EMANATING FROM A DIGITAL DISK

(75) Inventor: Fritz Lebowsky, Corps d'Uriage (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/670,774

(22) Filed: Sep. 27, 2000

(30) Foreign Application Priority Data

Sep. 30, 1999 (FR) .............................. 99 12199

(51) Int. Cl.[7] .............................. G11B 20/10
(52) U.S. Cl. .................... 369/53.34; 375/360; 375/376; 369/47.35
(58) Field of Search ............... 369/59.11, 59.19, 369/53.34, 47.35; 714/814; 375/360, 376

(56) References Cited

U.S. PATENT DOCUMENTS

| | | | |
|---|---|---|---|
| 4,495,474 A | | 1/1985 | Nishikawa et al. ............ 331/11 |
| 5,134,632 A | * | 7/1992 | Fletcher et al. ................ 375/22 |
| 5,598,396 A | * | 1/1997 | Horibe et al. ............. 369/47.25 |
| 6,118,745 A | * | 9/2000 | Hutchins et al. .......... 369/59.19 |
| 6,269,058 B1 | * | 7/2001 | Yamanoi et al. ......... 369/47.28 |
| 6,359,949 B1 | * | 3/2002 | OKada et al. .............. 375/376 |

FOREIGN PATENT DOCUMENTS

| EP | 0 727 782 | 8/1996 | ........... G11B/20/14 |
|---|---|---|---|
| EP | 0 918 396 | 5/1999 | ............. H03L/7/10 |

OTHER PUBLICATIONS

Patent Abstracts of Japan, vol. 1999, No. 10, Aug. 31, 1999 & JP 11 134817 A (Sharp Corp) May 21, 1999 *abstract*.

* cited by examiner

*Primary Examiner*—Aristotelis M. Psitos
(74) *Attorney, Agent, or Firm*—Allen, Dyer, Doppelt, Milbrath & Gilchrist, P.A.; Lisa K. Jorgenson (57) ABSTRACT

A method for extracting binary data conveyed by an incident signal is provided in which the binary data is coded in the form of a pulsatile signal whose pulses have variable lengths which are multiples of a base pulse length 1T. The incident signal may include a succession of transitions whose spacings are representative of the lengths of the pulses. The method may include an initialization phase in which the value of a base distance corresponding to the base pulse length is determined from the contents of the incident signal, and an extraction phase in which a set of reference values corresponding respectively to various multiples of the determined base distance is formulated. For a calculated current distance, the values of the data corresponding to this current distance may be determined from a comparison between the reference values and a current corrected distance. The current corrected distance is formulated from the current calculated distance, from a comparison error relating to the previous calculated distance, and from the filtered comparison error. The invention may advantageously be used with DVD and CD-ROM readers, for example.

27 Claims, 5 Drawing Sheets

PROCESS AND DEVICE FOR EXTRACTING BINARY DATA CONVEYED BY AN INCIDENT SIGNAL, IN PARTICULAR A SIGNAL EMANATING FROM A DIGITAL DISK

FIELD OF INVENTION

The invention relates to digital data storage and retrieval, and, more particularly, to retrieving binary data conveyed by an incident signal from a mobile carrier such as a digital disk.

BACKGROUND OF INVENTION

Digital disks, especially compact disks (CDs) (e.g., Read Only Memory compact disks ("CDROMs")) and multifunction digital disks (e.g., Digital Video Disks (or "DVDs")) are used for storing digital data in a compressed form. A digital disk includes a single spiral track whose relief is representative of the binary information stored on the track of the disk. The track of the disk is illuminated by an incident optical beam (e.g., a laser beam) and several photodetectors (e.g., four) detect the reflection of the light beam on the disk. The optical pickup formed by the photodetectors then delivers four elementary signals from the four photodetectors. The four elementary signals are also used for carrying out a slaving of the optical beam to the track of the disk. An overall or useful signal equal to the sum of the four elementary signals is also delivered by the optical pickup, from which the binary information read on the track may be extracted.

The coding of the binary information on the disk is standardized and well known to those of skill in the art (eg., RLL (2,10) coding). The length of the hollows and of the bumps present on the spiral track of the disk determines the number of logic 0 values flanked by two logic 1 values. Also, these lengths of hollows and bumps are all multiples of a base length commonly referred to by the designation "1T." By way of example, the value of +he base length 1T is equal to 0.64 microns for a OVD disk and 1.6 microns for a CD-ROM.

When the digital disk is rotating, the useful signal containing the binary data, also referred to as the "incident signal", herein includes a succession of transitions whose spacings are representative of the lengths of the pulses. Also, the higher the speed of rotation of the disk, the smaller the spacings between the transitions. Extracting the binary data conveyed by the incident signal thus includes detecting the transitions of the incident signal, calculating the distances separating the successive transitions, and determining the values of the data from the calculated distances.

At present, a digital phase-locked loop is used for extracting the binary data which, for each speed of rotation, uses a predefined value of a base distance corresponding to the base length (1T, also referred to as the "period 1T"). Furthermore, a phase-locked loop generally includes a digital filter, and the coefficients of the filter may depend upon on the speed of rotation. Of course, the linear rotation speed of a portion of a given track will vary depending upon on the distance of the portion from the center of the disk.

Additionally, when the laser beam is instructed (by the microprocessor of a computer, for example) to perform a displacement jump from one portion of a track to another portion of the track situated, for example, further out on the disk, the correct locking of the phase-locked loop requires the use of the predefined stored value of the base distance (1T), which corresponds to the new linear rotation value. Furthermore, the coefficients of the filter must likewise be modified by using a preprogrammed set of coefficients corresponding to the new rotation speed. Yet, if a positioning error is committed (i.e., if the information given by the photodetector leads to poor actual locating of the track portion and hence to a poor estimate of the new linear rotation speed), the phase-locked loop will use an inappropriate value for the new period 1T, as well as an inappropriate set of filter coefficients. Also, this may lead to a much longer locking of the phase-locked loop, and consequently to a much greater latency time before it is possible to extract correct data. In the worst case, locking is not performed and the disk is then ejected from the carrier.

SUMMARY OF THE INVENTION

It is therefore an object of the present invention to provide a method for extracting binary data conveyed by an incident signal that obviates the above problems.

According to the invention, a method for extracting binary data conveyed by an incident signal is provided where the binary data is coded in the form of a pulsatile signal whose pulses have variable lengths which are multiples of a base pulse length (period 1T). The incident signal includes a succession of transitions whose spacings are representative of the lengths of the pulses. The process may include detecting the transitions of the incident signal, calculating the distances separating the successive transitions, and determining the values of the data from the calculated distances.

More particularly, the method may include an initialization phase wherein the value of a base distance corresponding to the base pulse length is determined from the contents of the incident signal. The method may also include an extraction phase in which a set of reference values corresponding respectively to various multiples of the determined base distance (1T, 2T, . . . , 14T in the case of a DVD disk) is formulated. In certain cases a zero reference value corresponding to 0T may be stored. For a calculated current distance, the values of the data corresponding to this current distance are determined from a comparison of the reference values and a current corrected distance. The current corrected distance is formulated from the current calculated distance, from a comparison error relating to the previous calculated distance, and from the filtered comparison error.

Stated otherwise, the invention involves estimating the value of the base distance from the actual content of the incident signal, thereby intrinsically taking into account the rotation speed. In contrast, prior art methods typically require predefined and preprogrammed values corresponding to this base distance as a function of the various possible rotation values of the disk.

Furthermore, in the extraction phase the phase error may be directly corrected on the detected transitions of the signal (i.e., in tempo with the detected transitions) rather than in tempo with the signal sampling frequency, as in the prior art. Therefore, the coefficients of the filter of the phase-locked loop according to the invention become independent of the rotation speed of the disk and depend only on the physical characteristics of the disk, such as the inaccuracies of etching the track, for example. Thus, correction of the phase error is much more effective and rapid. Consequently, the latency duration for obtaining correct extracted binary data is also reduced.

The estimation of the period 1T may advantageously be performed algebraically. More particularly, according to one embodiment of the invention, the initialization phase may include at least one first subphase including the formulation of at least one first threshold distance from the current maximum calculated distance and corresponding to a first threshold length (e.g., 3.5T) situated between first and second successive multiples of the base length (e.g., 3T and 4T). This first subphase may also include comparing each current calculated distance with the first threshold distance, adding a first predetermined number (e.g., 21) of values of current calculated distances less than the first threshold distance, and dividing the sum thus obtained by a first predetermined divisor (for example 64) to obtain an estimated value of the base distance.

Such an initialization phase allows very rapid estimation of the value of the period 1T, typically within a duration equal of about two frames, i.e., 120 microseconds for a rotation speed of 1× (where a rotation speed of 1× corresponds to 4 m/second). Indeed, it has been observed that 70% of the logic values of the data transmitted corresponded to multiples 3T and 4T. Also, the combination of the particular characteristics of this initialization phase, with the estimation of the value of the period 1T from the actual content of the incident signal, makes it possible to obtain this rapidity of estimation.

If one wishes to obtain further accuracy in the estimated value of the base distance obtained (corresponding to the value of the period 1T), the initialization phase may include a second subphase, subsequent to the first subphase, in which a second threshold distance and a third threshold distance greater than the second threshold distance are formulated from the value of the base distance obtained on completing the first subphase. The second and third threshold distances correspond respectively to a first (e.g., 18T/4) and a second (e.g., 14T/4) threshold length flanking the second multiple of the base length on either side. Each current calculated distance is then compared with the second threshold distance and with the third threshold distance. A second predetermined number of values of current calculated distances (e.g., 32 values) between the second threshold distance and the third threshold distance may be summed. Also, the sum obtained may then be divided by a second predetermined divisor (e.g., 128) to obtain a new estimated value of the base distance. The foregoing alternative embodiment also makes it possible to estimate the value of the period 1T when the signal contains no distance corresponding to values 3T, for example.

In the extraction phase, the reference values may respectively include the integer multiples of the determined base distance between the base distance and a maximum multiple of this base distance. This maximum multiple corresponds to to a maximum multiple of the base length which can be contained in the incident signal (e.g., 14 in the case of a DVD and 11 in the case of a CD-ROM). Stated otherwise, in the case of a DVD, the values of 1T to 14T will be stored as reference values. The difference between the current corrected distance and the reference values is established and the minimum difference lying within a predetermined comparison range (e.g., −0.5T to +0.5T). The length of the pulse coding the values of the data corresponding to the current calculated distance thus corresponds to the multiple of the base length associated with the reference value having led to the selected minimum difference.

The pulsatile signal may include synchronization pulses whose occurrences are mutually spaced by a synchronization length equal to a predetermined fourth or synchronization multiple of the base length. For example, in the case of a DVD, the synchronization pulses have a length of 14T and their temporal occurrences are separated by a distance of 1488T. Two synchronization pulses may flank a stream of variable length pulses coding a data stream.

In yet another embodiment of the present invention, in the extraction phase a check of the value of the base distance may be performed by detecting the successive synchronization pulses and detecting the contents of the incident signal between two successive occurrences of a synchronization pulse. Thus, an additional check of the proper estimation of the value of the base length is provided.

Furthermore, the calculated distances corresponding to the synchronization pulses may be detected, and the sum of the multiples corresponding to the calculated distances delivered since the occurrence of a synchronization pulse up to a next synchronization pulse may be obtained. If this sum lies within a predetermined neighborhood or range (e.g., between 1474 and 1503) of the fourth multiple (1488 in the case of a DVD), the sum of the calculated distances which have been delivered between the two synchronization pulses is divided by the fourth multiple to obtain a new estimated value of the base distance.

According to the invention, a device for extracting binary data conveyed by an incident signal is also provided. The binary data may be coded in the form of a pulsatile signal whose pulses have variable lengths which are multiples of a base pulse length, and the incident signal may include a succession of transitions having distances therebetween representative of the lengths of the pulses. The device may include an input for receiving the incident signal, at least one detector or detection means for detecting the transitions of the incident signal, a calculating circuit for calculating the distances separating the successive transitions, and a processor or processing means for determining the values of the data from the calculated distances.

The process may include a preprocessing circuit or means for determining from the content of the incident signal the value of a base distance corresponding to the base pulse length and for storing this value in a register. The processing means may also include an extraction circuit or means for formulating a set of reference values corresponding respectively to various multiples of the base distance stored in the register. The extraction means may also form a correction loop that, for a calculated current distance, determines the values of the data corresponding to the current distance from a comparison between the reference values (1T to 14T, for example) and a current corrected distance formulated from the current calculated distance, from a comparison error relating to the previous calculated distance, and from the filtered comparison error. Additionally, the device may include a controller or control means for activating the preprocessing means and the extraction means.

The correction loop may include a first circuit or means for establishing a difference between the current corrected distance and each of the reference values (1T–14T, for example), a second circuit or means for selecting the minimum difference lying in a predetermined comparison range (e.g., −0.5T to +0.5T), and a filter connected to the output of the second means. Furthermore, the correction loop may also include a third circuit or corrector means having a first input receiving each current calculated distance, a second input receiving an output of the second means delayed by a first delay, a third input receiving an output of the filter delayed by a second delay, and an output connected to an input of the first means and delivering the current corrected distance, which is equal to the sum of the current calculated distance and the minimum difference minus the value of the output delivered by the filter. The correction loop may be regulated in synchronization with the transitions of the incident signal.

In some instances the pulsatile signal may include synchronization pulses whose occurrences are mutually spaced by a synchronization length equal to a predetermined multiple (e.g., 1488) of the base length and two synchronization pulses flanking a stream of variable length pulses coding a given stream. In such a case, the extraction means may include a checking circuit or means for checking the value of the base distance by detecting successive synchronization pulses (14T, for example) and detecting the contents of the incident signal between two successive occurrences of a synchronization pulse.

The preprocessing circuit or means may include a formulating circuit or means for formulating at least one first threshold distance from the current maximum calculated distance corresponding to a first threshold length between first (e.g., 3) and second (e.g., 4) successive multiples of the base length, a comparison means or comparator for comparing each current calculated distance with the first threshold distance, and a summation means or adder for adding a first predetermined number (e.g., 21) of values of current calculated distances less than the first threshold distance (3.5T, for example) to provide a sum, and a division circuit or divisor means for dividing the sum obtained by a first predetermined divisor (e.g., 64) to obtain an estimated value of the base distance. The device may be a digital disk reader such as a DVD disk reader, for example.

BRIEF DESCRIPTION OF THE DRAWINGS

Other advantages and features of the invention will become apparent upon examination of the detailed description of the preferred embodiments given by way of non-limiting example, and of the appended drawings, in which.

DETAILED DESCRIPTION OF THE PREFERRED EMBODIMENTS

Figure 1:
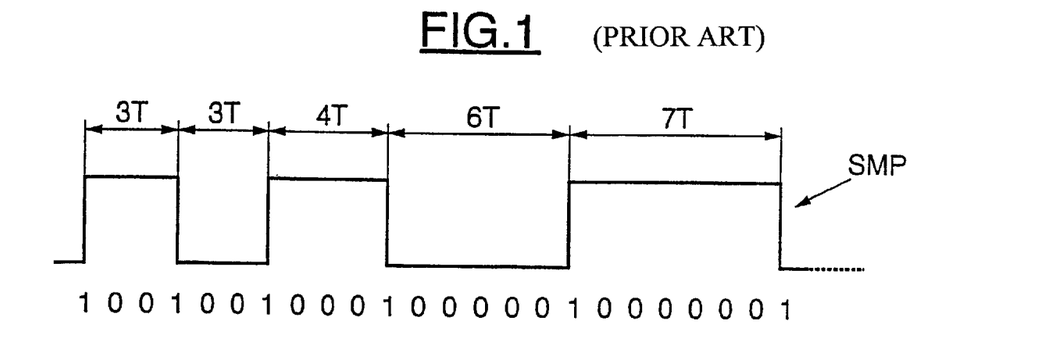
FIG. 1 illustrates an example of coding data in the form of a pulsatile signal according to the prior art.

Although the invention is not limited thereto, embodiments and modes of implementation which relate to DVD disk readers will now be described. Turning now to FIG. 1, a pulsatile signal SMP representative of the hollows and bumps of the spiral track of a disk is diagrammatically illustrated. In a conventional manner known to those of skill in the art, the lengths of the hollows and of the bumps define the coding of the binary values. Also, these lengths are all multiples of a base pulse length (hereinafter "1T"). By way of example, the length 1T is equal to 0.64 microns in the case of a DVD disk.

The multiple of this base length ("period 1T") represents the number of logic 0 value between two logic 1 values. Thus, a length 3T codes the binary value 1001, while a length 6T codes the binary value 1000001. With reference to RLL (p, q) coding, p and q denote the minimum and maximum numbers of zeros which have been coded. Thus, an RLL value equal to 2 corresponds to a length 3T and two "zeros" flanked on either side by two "1"s.

Figure 2:
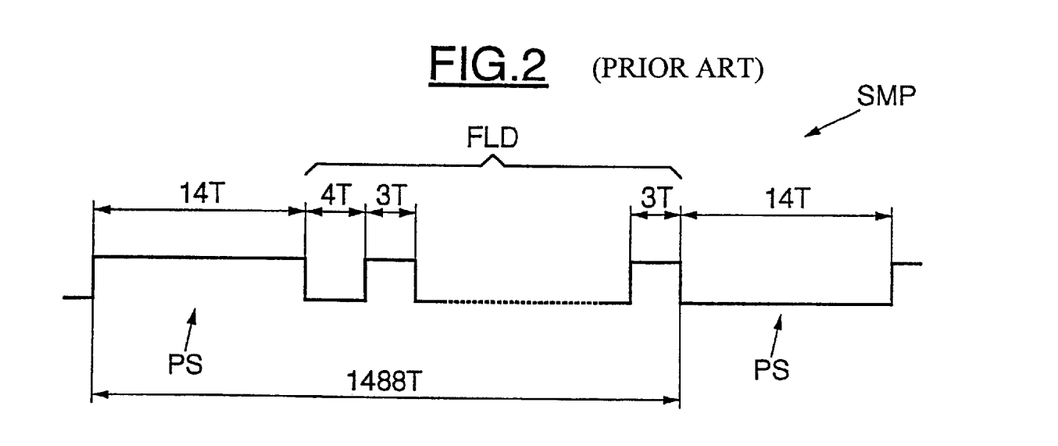
FIG. 2 illustrates a data stream flanked by two synchronization pulses of a type present on a DVD disk according to the prior art.

In a DVD disk, the binary data stream FLD (shown in FIG. 2), which includes pulses of variable lengths which can vary from 3T to 11T, is flanked by two synchronization pulses PS having a predetermined length equal to 14T. Furthermore, the distance between the successive occurrences of two synchronization pulses (i.e., the distance between the start of a synchronization pulse and the start of the next synchronization pulse) is also fixed and is equal to 1488T.

Figure 3:
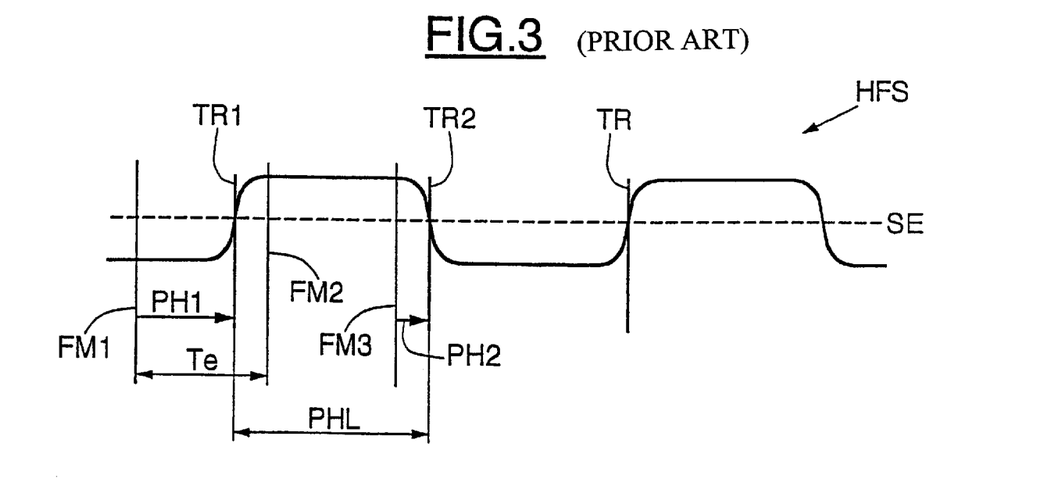
FIG. 3 illustrates an incident signal from which binary data may be extracted according to the prior art.

As illustrated in FIG. 3, the useful or incident signal HFS, which includes the binary data and is delivered by the photodetectors, includes a succession of transitions TR. These transitions represent the overstepping of a predetermined threshold SE, e.g., the value 0. The data extraction will include detecting the successive transitions, calculating the distances PHL separating two successive transitions (e.g., TR1 and TR2) and determining the values of the data from these calculated distances.

Figure 4:
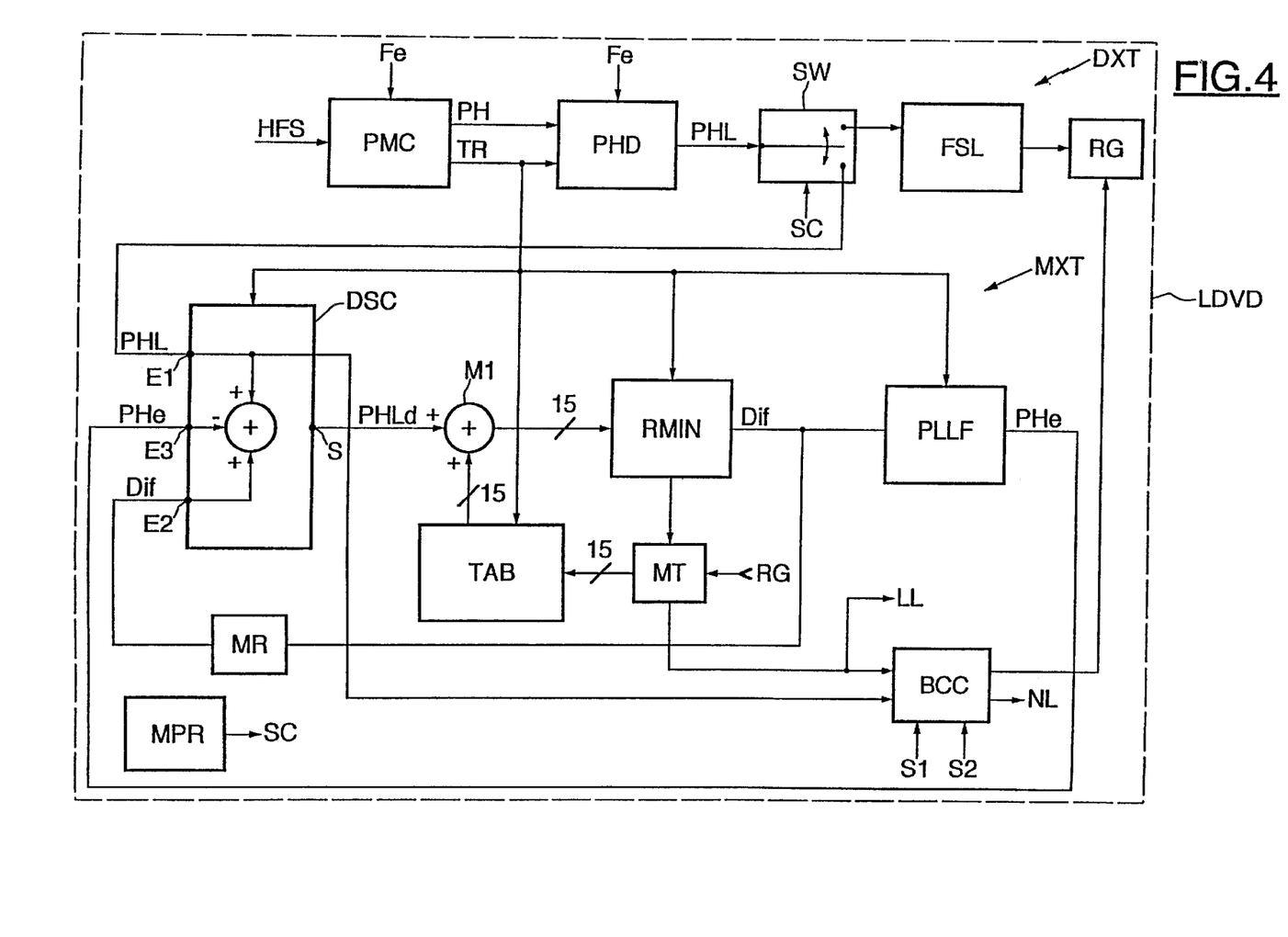
FIG. 4 is a schematic block diagram illustrating an embodiment of a device according to the present invention for a DVD disk reader LDVD.

The incident signal HFS is sampled at a sampling frequency Fe corresponding to a sampling period Te separating successive rising edges FM1, FM2 of the sampling clock signal. The reference PH1 denotes the time gap, or phase, separating the transition TR1 from the rising edge FM1, while the reference PH2 denotes the phase separating the transition TR2 from the rising edge FM3. The distance PHL therefore corresponds to a phase difference or "length" between the two transitions. As illustrated in FIG. 4, the incident signal HFS is received in means PMC forming a first digital phase-locked loop of a structure known in the art. This digital loop PMC receives the signal HFS equalized after passing through an equalizer which is also known in the art. The loop PMC uses the sampling clock signal (frequency Fe) delivered, for example, by a quartz (not shown here for simplification).

The means PMC formulates an auxiliary sampling signal whose period is equal to Te/n, where Te is the period of the sampling clock signal and n is an integer. The means PMC detects any transition of the signal HFS with respect to the threshold SE and determines in which interval of the auxiliary sampling signal the transition lies. More precisely, the means PMC outputs a digital word representative of the gap or phase PH between any detected transition of the signal HFS and the rising edge (e.g., FM1) of the immediately preceding clock signal.

By way of example, in practice a phase-locked loop PMC typically includes 32 inverters making it possible to subdivide the period Te of the sampling clock signal into 32 intervals (n=32). The means PMC will deliver a 5-bit word representing the number of the interval in which the transition lies, i.e., the gap PH between the rising edge of the sampling clock signal and the transition of the signal. Thus, a digital word equal to 00000 will be representative of a transition in phase with the rising edge of the clock signal, while a digital word equal to 11111 will be representative of a transition lying just ahead of the next rising edge of the clock signal.

The various values of the phases are transmitted to a means PHD for calculating a current distance PHL between two successive transitions of the signal, i.e., the phase difference between the two transitions. This current calculated distance PHL may be obtained by knowing the value of the sampling period Te as well as the values of the phases PH1 and PH2.

The next block of the extraction device according to the invention DXT is represented diagrammatically in the form of a switch SW controlled by a control signal SC emanating from a higher-level control means. The control means may be incorporated into a microprocessor MPR, for example. The block SW may be implemented without hardware, as will be appreciated by those of skill in the art, but is shown in FIG. 4 to illustrate the various phases of the data extraction process according to the invention.

Indeed, after energizing the device DXT, an initialization phase is provided in which the value of a base distance corresponding to the base pulse length (1T) is determined from the contents of the incident signal. This is the role of preprocessing means FSL, the operating modes of which will now be described with reference to FIGS. 5 and 6. The function of the preprocessing means FSL is to provide, in an extremely short time (e.g., over a duration of two frames) an estimate of the base distance (1T) corresponding to the base pulse length (1T). This value of the base distance 1T obtained from the contents of the incident signal will thereafter be stored in a register RG (FIG. 4) to be used by the extraction means MXT, which allows decoding of the binary data conveyed by the incident signal.

Figure 5:
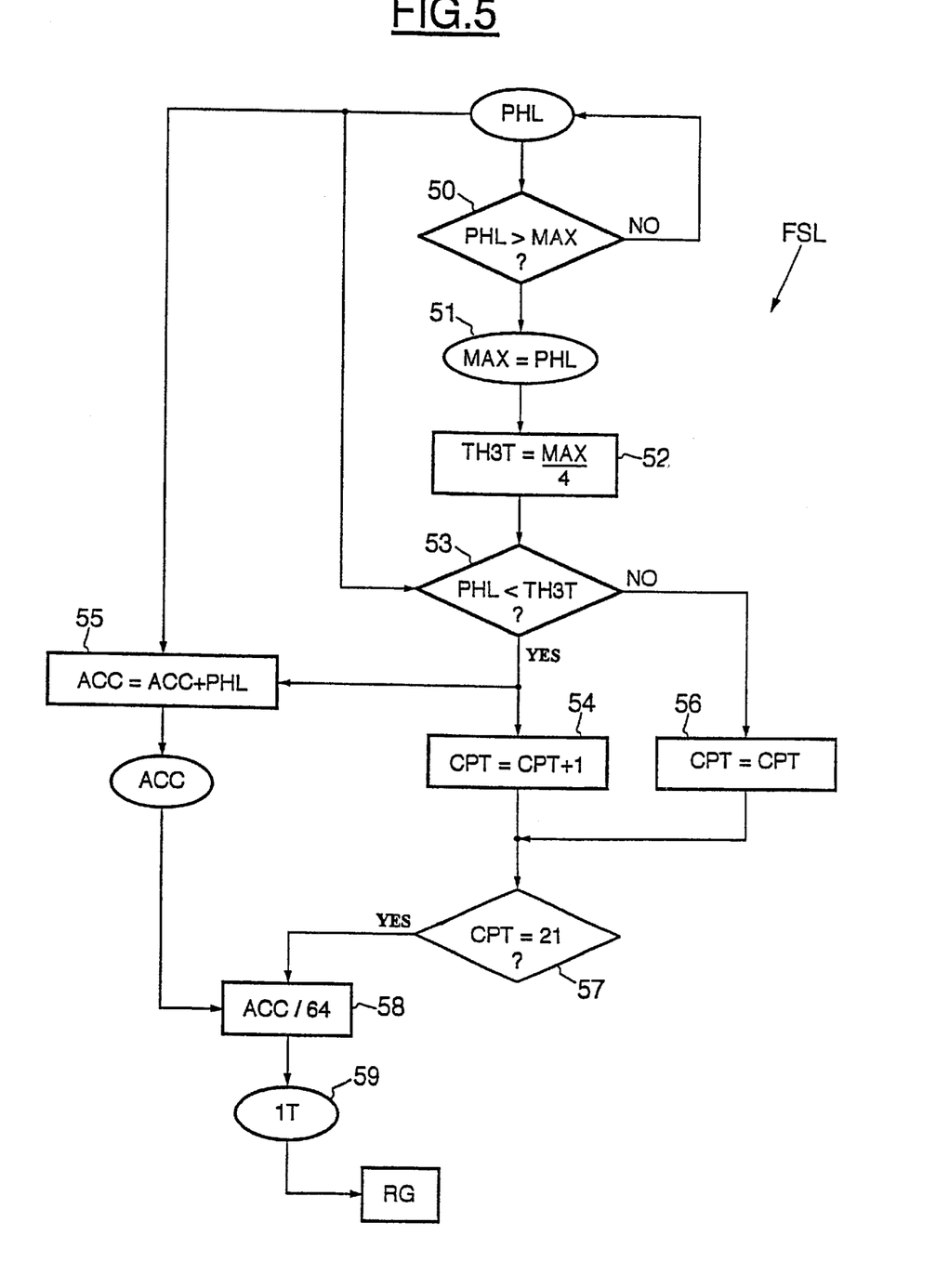
FIGS. 5 and 6 are flow diagrams illustrating two modes of implementation of an initialization phase of a method according to the invention which allows estimation of the value of the base length 1T.

A first initialization subphase in which a value of the base distance 1T is estimated algebraically from a number of calculated distances corresponding to lengths 3T is shown in FIG. 5. A first threshold distance TH3T corresponding to a first threshold length (3.5T) between two successive multiples of the base length (here, 3T and 4T) is first formulated in real time. This formulation of the first threshold distance TH3T will be performed automatically from the current maximum calculated distance. Specifically, in a step 50 the current calculated distance PHL delivered by the means PHD is compared with a number MAX stored, for example, in a register and initially equal to 0. If the current calculated distance PHL is greater than the number MAX, the number MAX takes the value of the current calculated distance PHL (Step 51). In Step 52, the first threshold distance TH3T is determined by dividing the number MAX by four. For a DVD disk reader, the number MAX will correspond to a length of 14T, which is the maximum length encountered on a DVD disk.

In Step 53, the current calculated distance PHL is compared with the first threshold distance TH3T. The result of this comparison will condition the incrementation of a counter CPT initially having the value 0. If the current calculated distance PHL is greater than or equal to the first threshold distance TH3T then the value of the counter does not move (Step 56). On the other hand, if the current calculated distance PHL is less than the first threshold distance TH3T then the counter is incremented by one unit (Step 54). At the same time, the value of this current calculated distance PHL is added to the value ACC of an accumulator, initially 0 (Step 55).

Those of skill in the art will appreciate that the comparison performed in Step 53 will lead in practice to Steps 54 and 55, if the current calculated distance PHL corresponds to a length 3T and if the first threshold distance TH3T has been obtained from a distance PHL corresponding to a length of 14T. That is, the counter CPT will then only be incremented each time there has been a detection of a calculated current distance PHL corresponding to a length 3T. The number of times that a current calculated distance PHL corresponding to a length 3T has been detected is then counted. When the value of the counter CPT reaches the number 21 (Step 57), the content of the accumulator ACC is then divided by 64 (Step 58).

Since each current calculated distance PHL having led to the incrementation of the counter CPT corresponds to a length 3T, the sum of these 21 values therefore corresponds to a length of 21×3T, i.e., 63T. Dividing the value of the accumulator ACC by 64 therefore gives a good estimate, to within 63/64, of the base distance 1T (Step 59) corresponding to the theoretical length 1T. This value is thereafter stored in the register RG. Of course, to further increase the accuracy, it would have been possible to choose a number of distances PHL which are smaller than the threshold TH3T and are equal to an integer multiple r of 21. In the present example, it would have been necessary to divide the content of the accumulator ACC in Step 58 by 64 r.

Those of skill in the art will thus appreciate that this first initialization subphase illustrated in FIG. 5 makes it possible to obtain an estimate of the value of the base distance 1T from the distances 3T of the incident signal. The first initialization subphase may also be supplemented with a second subphase, illustratively shown in FIG. 6. The second subphase makes it possible to provide a new estimated value of the base distance 1T with even greater accuracy and from the distances 4T of the incident signal.

Figure 6:
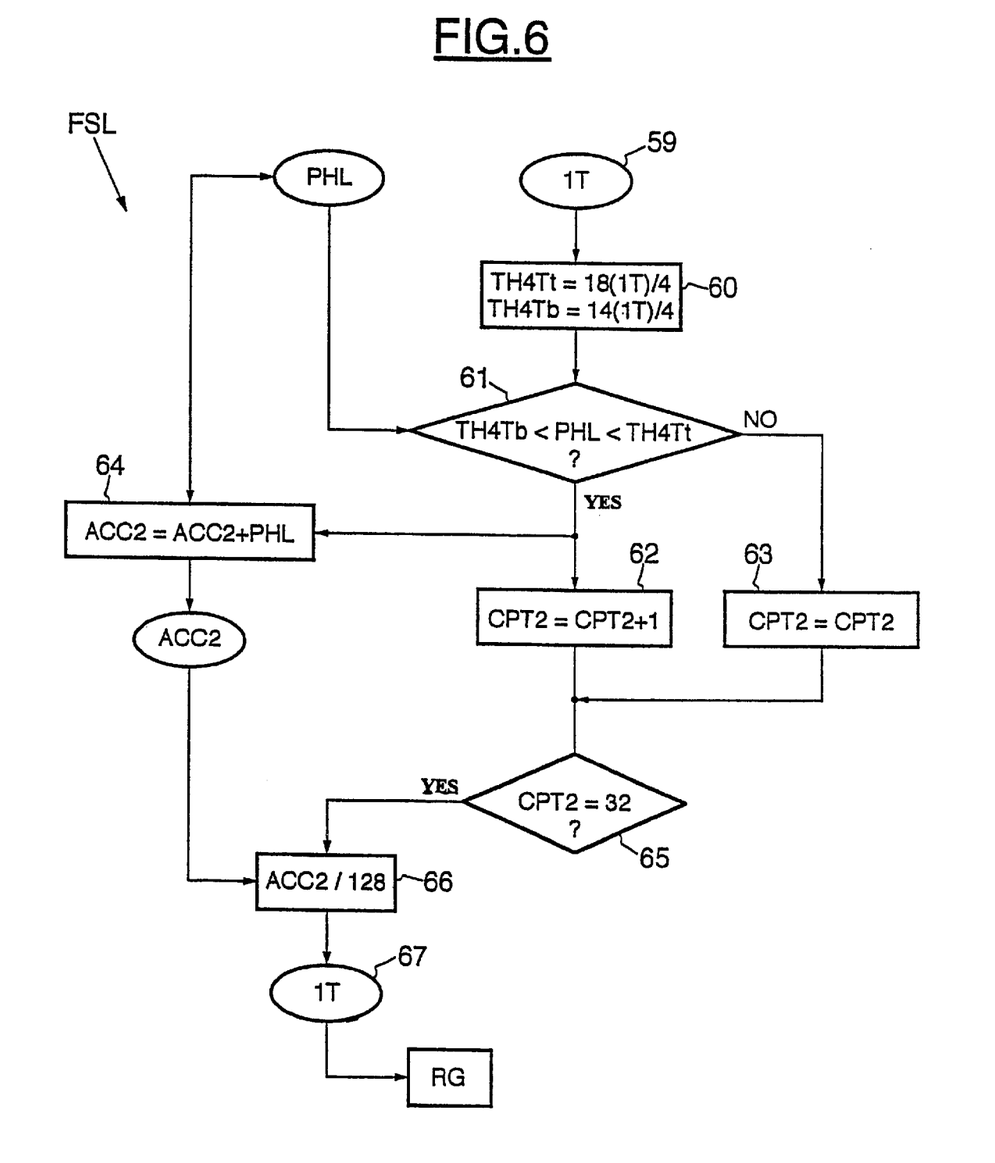

In this regard, a second threshold distance TH4Tb and a third threshold distance TH4Tt are formulated from the value of the base distance 1T obtained upon completion of the first subphase (reference 59 in FIG. 5 and in FIG. 6). The second threshold distance is equal to 14 times the value 1T obtained in Step 59 divided by 4, while the third threshold distance is equal to 18 times the value 1T obtained in Step 59 divided by 4 (Step 60). Thus, the second and third threshold distances are theoretically equal to 3.5T and 4.5T and therefore flank a second multiple of the base length 1T, i.e., they flank the multiple 4.

In Step 61, a comparison of the current calculated distance PHL is performed in relation to each of these second and third threshold distances. If the current calculated distance PHL does not lie strictly between these two threshold distances, then a second counter CPT2, initially equal to 0, is not incremented (Step 63). Conversely, the counter CPT2 is incremented by one unit (Step 62) if the current calculated distance PHL is between these two threshold distances, and in parallel with this a second accumulator ACC2 (initially at 0) is increased by the value of the current calculated distance PHL.

When the counter CPT2 reaches a second predetermined number, in this case 32 (Step 65), the content of the accumulator ACC2 is divided by 128 (Step 66), thereby making it possible to obtain a new value for the base distance 1T (Step 67). Those of skill in the art will appreciate that since the current calculated distances PHL having led to Steps 62 and 64 correspond in theory to distances 4T, and since 32 values are counted up, the final content of the accumulator therefore corresponds to 32×4T, i.e., 128T. The value 1T obtained from the distances 4T is therefore more accurate than that obtained in Step 59, i.e., after the first initialization subphase illustrated in FIG. 5. Here again, it would have been possible to use a multiple m of 32 for the value of the counter CPT2 upon dividing by 128 m in Step 66. From a hardware standpoint, apart from the elements such as counters, summators, and accumulators referenced above used for implementing the initialization phase, the preprocessing means FSL may readily be embodied through logic synthesis or software in view of the above described algorithms.

Once the value of the distance 1T has been estimated and stored in the register RG (FIG. 4), the higher-level checking means switches the switch SW to its other output to activate the data extraction means MXT, which will now be further described with reference to FIG. 4. The data extraction means MXT will make it possible to decode the data conveyed by the incident signal by using the estimated value of the base distance 1T stored in the register RG. To do this, the extraction means MXT, includes means MT for formulating a set of fourteen reference values corresponding respectively to all the integer multiples of the determined base distance (1T) lying between this base distance and the maximum multiple of this base distance. The maximum multiple corresponds to the maximum multiple of the base length which can be contained in the incident signal. Thus, in the case of a DVD, the fourteen reference values, corresponding respectively to the product of the estimated base distance 1T stored in the register multiplied by the integer numbers 1 to 14, are stored as reference values in a memory TAB. The value 0 is also stored as a fifteenth reference value to optionally allow latching, upon a large phase shift, of the comparison range equal to −0.5 to +0.5 times the value 1T stored in the register RG. This reference range may be stored in a memory of the means RMIN.

The extraction means MXT includes means forming a correction loop which includes a corrector means DSC. The corrector means DSC includes a first input E1 for receiving each current calculated distance PHL, a second input E2 connected to the output of the means RMIN by a first delay means MR, and a third input E3 connected to the output of a loop filter PLLF by a second delay means, which can be incorporated into a conventional loop filter structure known in the art.

The corrector means DSC includes an output S delivering a current corrected distance PHLd formulated from the current calculated distance PHL, from the comparison error Dif relating to the previous calculated distance, and from the filtered comparison error PHe. In the present case, the current calculated distances PHL are negative and the reference values in the memory TAB are positive. This is why a "+" sign is represented on the input E1 of the means DSC, which receives the negative distance PHL. The current corrected distance PHLd corresponding to the current calculated distance PHL received by the means DSC is correspondingly negative.

The adder M1 therefore establishes the difference between this current corrected distance PHLd and each of the reference values stored in the memory TAB. The result is a set of fifteen values which the means RMIN compares with the previously mentioned reference range. The means RMIN then selects the minimum difference Dif lying within the predetermined comparison range −0.5T to +0.5T. This minimum difference Dif is then associated with one of the reference values stored in the memory TAB and hence with one of the integer multiples of the base distance 1T. If, for example, the result of the comparison makes it possible to demonstrate that it is the reference value 10T which has led to the minimum difference, the formulating means MT will then deduce that the current calculated distance PHL delivered to the input of the loop in fact corresponds to a length 10T. The means MT will therefore output from the loop a logic cue LL corresponding to the number 10, and this will be interpreted by subsequent decoding means (not shown for simplification) as signifying nine zeros flanked by two ones.

In parallel with this operation and to allow the permanent locking of the loop, the minimum difference Dif will be taken into account directly in the corrector means DSC upon the delivery of the next current calculated distance. It is therefore possible to perform very rapid correction of varying phase shifts. Furthermore, a slow correction of the phase shift is obtained by the coefficients of the loop filter PLLF, which may be a finite impulse response recursive filter known to those of skill in the art. Here again, the filtered error PHe will be taken into account for the next current calculated distance PHL by the delay means, which is generally incorporated into the structure of the filter.

Selection by the means RMIN of a reference value 0T, 1T or 2T having led to a minimum difference will be regarded as an anomaly. Thus, the current calculated distance will in fact be regarded as a distance 3T and the phase-shift error will be immediately corrected accordingly. The same holds true if one of the reference values selected is the value 12 or 13T. It will then be regarded as being a value 11T.

As will be appreciated by those of skill in the art, the means DSC, RMIN, PLLF, MR form a main digital phase-locked loop regulated in synchronization with the detected transitions TR, which thus allows rapid correction of various phase shifts by the direct feedback of the value Dif and slow correction by a loop filter whose coefficients are independent of the speed of rotation of the disk. The extraction means MXT may furthermore advantageously include checking means BCC which also operates like a digital checking loop. The means MXT also makes it possible to check the proper locking of the main digital loop and to sharpen the estimate of the base distance 1T by using the distance separating two synchronization pulses of the incident signal.

Figure 7:
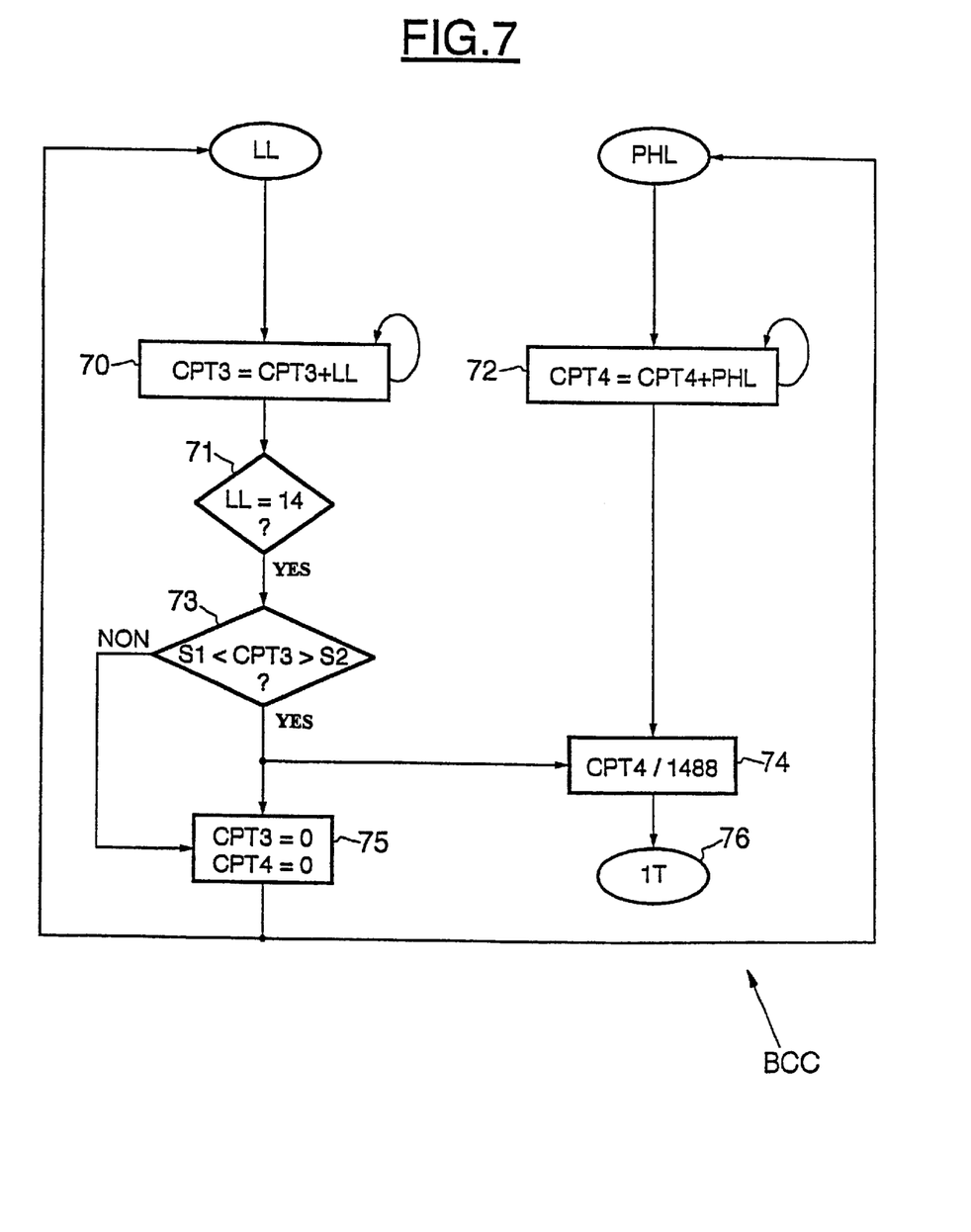
FIG. 7 is a flow diagram illustrating a check of the estimate of the base length 1T using successive synchronization pulses.

Turning now more particularly to FIG. 7, a mode of operation of the checking means BCC is now described. The means BCC may include a counter CPT3 and a counter CPT4. The counter CPT3 is for summing the values of the various values (multiples) LL corresponding to the various calculated current distances PHL. The counter CPT4 is for summing the current calculated distances PHL intervening between two successive occurrences of synchronization pulses. Specifically, in Step 75 it is assumed that a synchronization pulse (14T) has been detected which resets the counters CPT3 and CPT4 to zero.

In Step 70, the counter CPT3 will sum all the multiples LL delivered by the processing means up to and including the next multiple LL equal to 14. Likewise, in parallel with this operation, the counter CPT4 will sum all the distances PHL corresponding to these various multiples (Step 72). When the next synchronization pulse has been detected (Step 71), the content of the counter CPT3 will be compared with two predetermined thresholds S1 and S2 (Step 73). If the counter CPT3 lies between these two thresholds, the content of the counter CPT4 will be divided (Step 74) by 1488 to obtain a new estimate of the period 1T (Step 76). The counters CPT3 and CPT4 are then reset to zero and the cycle recommences until the next synchronization pulse.

Those of skill in the art will therefore appreciate that this correction loop makes it possible to provide a new estimate of the value of the base distance 1T, this time from the distances aggregated between two synchronization pulses. Furthermore, it makes it possible to provide a proper locking logic signal of the main correction loop of the data extraction means MXT where the counter CPT3 actually lies between the two thresholds. These two thresholds may be chosen to be slightly less than and slightly greater than 1488, for example. Conversely, in the case where the value of the counter CPT3 does not lie between these two thresholds, this signifies that the main correction loop is not correctly locked. In this case, a non-locking logic signal NL may be emitted (FIG. 4), the usage of which will be decided at a higher system level.

In this regard, the higher-level control means MPR may either decide to wait for a new estimate of the period 1T on the basis of the synchronization pulses, or to reactivate the preprocessing means FSL to re-estimate a value of the period 1T. The digital checking loop may, in the same way as the preprocessing means, be embodied at least partially on the basis of logic synthesis rules, as is also the case with the main digital loop.

Of course, the above described example also applies not just to DVD disks but also to CD-ROM disks and other information carriers. Those of skill in the art will appreciate how to tailor the various values of the threshold distances, as well as the various values of the thresholds S1 and S2, as a function of the data coding used for a given information carrier. By way of example, in the case of the CD-ROM, the synchronization pulses have lengths of 11T and are separated by a distance of 588T instead of 1488T in a DVD.

That which is claimed is:

1. A method for extracting binary data conveyed by an incident signal, the binary data being coded in a pulsatile signal having pulses of variable lengths which are multiples of a base pulse length, the method comprising:
   detecting a plurality of transitions in the incident signal;
   calculating current distances between the transitions, the distances being representative of the lengths of the pulses;
   formulating current corrected distances from the current calculated distances, a comparison error relating to a previously calculated distance, and a filtered comparison error;
   determining a base distance corresponding to the base pulse length;
   formulating at least one reference value corresponding to at least one multiple of the determined base distance; and
   determining the values of the binary data for each current calculated distance by comparing the at least one reference value and the current corrected distances.

2. The method of claim 1 wherein the binary data is extracted from an incident signal conveyed by a digital disk.

3. The method of claim 1 wherein determining the values of the binary data comprises:
   establishing a difference between the current corrected distance and the at least one reference value;
   selecting a minimum difference within a predetermined comparison range; and
   determining a multiple of the base length resulting in the selected minimum difference to thereby determine a length of the pulse coding the values of the binary data corresponding to the current calculated distance.

4. The method of claim 1 wherein determining the base distance comprises:
   formulating at least one first threshold distance from a current maximum calculated distance and corresponding to a first threshold length between successive first and second multiples of the base length;
   comparing each current calculated distance with the first threshold distance;
   adding a first predetermined number of current calculated distances less than the first threshold distance to obtain a first sum; and
   dividing the sum by a first predetermined divisor to obtain an estimated value of the base distance.

5. The method of claim 4 wherein determining the base distance comprises:
   formulating a second threshold distance and a third threshold distance greater than the second threshold distance from the estimated value of the base distance, the second and third threshold distances corresponding respectively to a first and a second threshold length to each side of the second multiple of the base length;
   comparing each current calculated distance with the second and third threshold distances;
   adding a second predetermined number of current calculated distances between the second threshold distance and the third threshold distance to obtain a second sum; and
   dividing the second sum by a second predetermined divisor to obtain a new value of the base distance.

6. The method of claim 1 wherein formulating the at least one reference value comprises multiplying the base value by each of a plurality of integer multiples between the base distance and a maximum multiple of the base distance to thereby form a plurality of reference values, the maximum multiple corresponding to a maximum number of base lengths which may be contained in the incident signal.

7. The method of claim 1 wherein the pulsatile signal comprises synchronization pulses whose occurrences are mutually spaced by a synchronization length equal to a predetermined synchronization multiple of the base length; wherein each stream of data pulses has a synchronization pulse to each side; and wherein determining the value of the binary data comprises checking the base distance by detecting successive synchronization pulses and detecting the contents of the incident signal between two successive occurrences of a synchronization pulse.

8. The method of claim 7 further comprising:
   detecting the calculated distances corresponding to the synchronization pulses;
   adding the multiples corresponding to the calculated distances delivered since the occurrence of a synchronization pulse up to the occurrence of a next synchronization pulse to obtain a sum; and
   dividing the sum by the predetermined synchronization multiple to obtain a new value of the base distance if this sum lies within a predetermined range of the predetermined synchronization multiple.

9. A method for extracting binary data conveyed by an incident signal, the binary data being coded in a pulsatile signal having pulses of variable lengths which are multiples of a base pulse length, the method comprising:
   detecting a plurality of transitions in the incident signal;
   calculating current distances between the transitions, the distances being representative of the lengths of the pulses;
   formulating current corrected distances from the current calculated distances;
   determining a base distance corresponding to the base pulse length;
   formulating at least one reference value corresponding to at least one multiple of the determined base distance; and
   determining the values of the binary data for each current calculated distance by
      establishing a difference between the current corrected distance and the at least one reference value, selecting a minimum difference within a predetermined comparison range, and determining a multiple of the base length resulting in the selected minimum difference to thereby determine a length of the pulse coding the values of the binary data corresponding to the current calculated distance.

10. The method of claim 9 wherein the binary data is extracted from an incident signal conveyed by a digital disk.

11. The method of claim 9 wherein determining the base distance comprises;

formulating at least one first threshold distance from a current maximum calculated distance and corresponding to a first threshold length between successive first and second multiples of the base length;

comparing each current calculated distance with the first threshold distance;

adding a first predetermined number of current calculated distances less than the first threshold distance to obtain a first sum; and dividing the sum by a first predetermined divisor to obtain an estimated value of the base distance.

12. The method of claim 11 wherein determining the base distance further comprises:

formulating a second threshold distance and a third threshold distance greater than the second threshold distance from the estimated value of the base distance, the second and third threshold distances corresponding respectively to a first and a second threshold length to each side of the second multiple of the base length;

comparing each current calculated distance with the second and third threshold distances;

adding a second predetermined number of current calculated distances between the second threshold distance and the third threshold distance to obtain a second sum; and dividing the second sum by a second predetermined divisor to obtain a new value of the base distance.

13. The method of claim 9 wherein formulating the at least one reference value comprises multiplying the base value by each of a plurality of integer multiples between the base distance and a maximum multiple of the base distance to thereby form a plurality of reference values, the maximum multiple corresponding to a maximum number of base lengths which may be contained in the incident signal.

14. The method of claim 9 wherein the pulsatile signal comprises synchronization pulses whose occurrences are mutually spaced by a synchronization length equal to a predetermined synchronization multiple of the base length; wherein each stream of data pulses has a synchronization pulse to each side; and wherein determining the value of the binary data comprises checking the base distance by detecting successive synchronization pulses and detecting the contents of the incident signal between two successive occurrences of a synchronization pulse.

15. The method of claim 14 further comprising:

detecting the calculated distances corresponding to the synchronization pulses;

adding the multiples corresponding to the calculated distances delivered since the occurrence of a synchronization pulse up to the occurrence of a next synchronization pulse to obtain a sum; and dividing the sum by the predetermined synchronization multiple to obtain a new value of the base distance if this sum lies within a predetermined range of the predetermined synchronization multiple.

16. A method for extracting binary data conveyed by an incident signal from a digital disk, the binary data being coded in a pulsatile signal including synchronization pulses mutually spaced by a synchronization length equal to a predetermined synchronization multiple of a base length and data pulses between the synchronization pulses of variable lengths which are multiples of the base pulse length, the method comprising:

detecting a plurality of transitions in the incident signal;

calculating current distances between the transitions, the distances being representative of the lengths of the pulses;

formulating current corrected distances from the current calculated distances;

determining a base distance corresponding to the base pulse length by formulating at least one first threshold distance from a current maximum calculated distance and corresponding to a first threshold length between successive first and second multiples of the base length, comparing each current calculated distance with the first threshold distance, adding a first predetermined number of current calculated distances less than the first threshold distance to obtain a first sum, and dividing the sum by a first predetermined divisor to obtain an estimated value of the base distance;

formulating at least one reference value corresponding to at least one multiple of the determined base distance; and determining the values of the binary data for each current calculated distance by comparing the at least one reference value and the current corrected distances.

17. The method of claim 16 wherein determining the base distance comprises:

formulating at least one first threshold distance from a current maximum calculated distance and corresponding to a first threshold length between successive first and second multiples of the base length;

comparing each current calculated distance with the first threshold distance;

adding a first predetermined number of current calculated distances less than the first threshold distance to obtain a first sum; and dividing the sum by a first predetermined divisor to obtain an estimated value of the base distance.

18. The method of claim 17 wherein determining the base distance further comprises:

formulating a second threshold distance and a third threshold distance greater than the second threshold distance from the estimated value of the base distance, the second and third threshold distances corresponding respectively to a first and a second threshold length to each side of the second multiple of the base length;

comparing each current calculated distance with the second and third threshold distances;

adding a second predetermined number of current calculated distances between the second threshold distance and the third threshold distance to obtain a second sum; and dividing the second sum by a second predetermined divisor to obtain a new value of the base distance.

19. The method of claim 16 wherein formulating the at least one reference value comprises multiplying the base value by each of a plurality of integer multiples between the base distance and a maximum multiple of the base distance to thereby form a plurality of reference values, the maximum multiple corresponding to a maximum number of base lengths which may be contained in the incident signal.

20. The method of claim 16 further comprising:
   detecting the calculated distances corresponding to the synchronization pulses;
   adding the multiples corresponding to the calculated distances delivered since the occurrence of a synchronization pulse up to the occurrence of a next synchronization pulse to obtain a sum; and
   dividing the sum by the predetermined synchronization multiple to obtain a new value of the base distance if this sum lies within a predetermined range of the predetermined synchronization multiple.

21. A device for extracting binary data conveyed by an incident signal, the binary data being coded in a pulsatile signal having pulses of variable lengths which are multiples of a base pulse length, the incident signal comprising a plurality of transitions having corresponding distances therebetween representative of the lengths of the pulses, the device comprising:
   a detector for detecting the transitions of the incident signal;
   a calculating circuit for calculating the distances separating the successive transitions; and
   a processor for determining the values of the data from the calculated distances, the processor comprising
      a preprocessing circuit for determining from the content of the incident signal a base distance corresponding to the base pulse length,
      a register for storing the base distance, and
      an extracting circuit for formulating a set of reference values corresponding respectively to various multiples of the base distance stored in the register, said extracting circuit also forming a correction loop for determining the values of the data corresponding to a current distance by formulating current corrected distances from the current calculated distances, a comparison error relating to a previous calculated distance, and a filtered comparison error, and said extracting circuit further determining the values of the binary data for each current calculated distance by comparing the reference values and current corrected distances; and
   a controller for activating the preprocessing circuit and the extracting circuit.

22. The device of claim 21 wherein the correction loop comprises:
   a first circuit for establishing a difference between the current corrected distance and each of the reference values;
   a second circuit for selecting a minimum difference within a predetermined comparison range,
   a filter connected to the output of the second circuit;
   a third circuit having a first input receiving each current calculated distance, a second input receiving an output of the second circuit delayed by a first delay, a third input receiving an output of the filter delayed by a second delay, and an output connected to an input of the first circuit and delivering the current corrected distance, the current corrected distance being equal to a sum of the current calculated distance and the minimum difference minus the value of the output delivered by the filter.

23. The device of claim 21 wherein the correction loop is regulated in synchronization with the transitions of the incident signal.

24. The device of claim 21 wherein the pulsatile signal comprises synchronization pulses whose occurrences are mutually spaced by a synchronization length equal to a predetermined synchronization multiple of the base length; wherein each stream of data pulses has a synchronization pulse to either side; and wherein said extracting circuit comprises a checking circuit for checking the base distance by detecting successive synchronization pulses and detecting the contents of the incident signal between two successive occurrences of a synchronization pulse.

25. The device of claim 21 wherein the preprocessing circuit comprises:
   a circuit for formulating at least one first threshold distance from a current maximum calculated distance and corresponding to a first threshold length between successive first and a second multiples of the base length;
   a comparator for comparing each current calculated distance with the first threshold distance;
   an adder for adding a first predetermined number of current calculated distances less than the first threshold distance to obtain a first sum; and
   a division circuit for dividing the sum by a first predetermined divisor to obtain an estimated value of the base distance.

26. A method for extracting binary data conveyed by an incident signal, the binary data being coded in a pulsatile signal having pulses of variable lengths which are multiples of a base pulse length, the method comprising;
   detecting a plurality of transitions in the incident signal;
   calculating current distances between the transitions, the distances being representative of the lengths of the pulses;
   formulating current corrected distances from the current calculated distances;
   determining a base distance corresponding to the base pulse length;
   formulating at least one reference value corresponding to at least one multiple of the determined base distance by multiplying the base value by each of a plurality of integer multiples between the base distance and a maximum multiple of the base distance to thereby form a plurality of reference values, the maximum multiple corresponding to a maximum number of base lengths in the incident signal; and
   determining the values of the binary data for each current calculated distance by comparing the at least one reference value and the current corrected distances.

27. The method of claim 26 wherein the binary data is extracted from an incident signal conveyed by a digital disk.

* * * * *

UNITED STATES PATENT AND TRADEMARK OFFICE
CERTIFICATE OF CORRECTION

PATENT NO. : 6,529,459 B1
DATED : March 4, 2003
INVENTOR(S) : Fritz Lebowsky

It is certified that error appears in the above-identified patent and that said Letters Patent is hereby corrected as shown below:

Column 1,
Line 40, delete "+he" insert -- the --
Line 41, delete "OVD" insert -- DVD --

Signed and Sealed this

Seventeenth Day of June, 2003

JAMES E. ROGAN
*Director of the United States Patent and Trademark Office*